June 8, 1965     D. R. SOMMER     3,187,398
KEY OPERATED BUCKLE CLAMP
Filed May 31, 1963     2 Sheets-Sheet 1
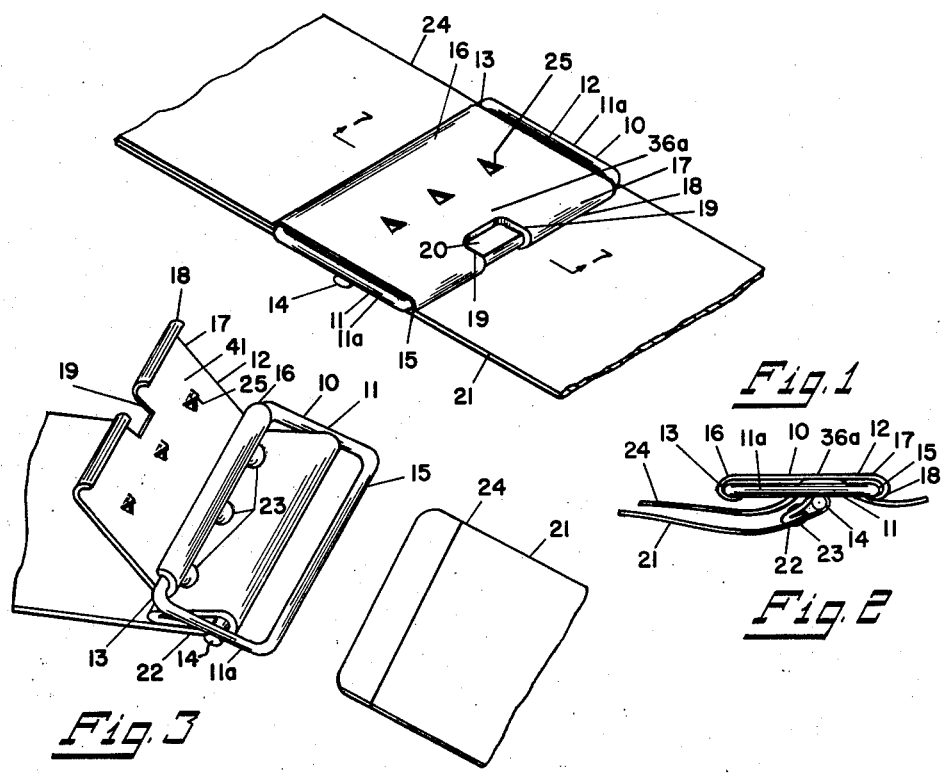
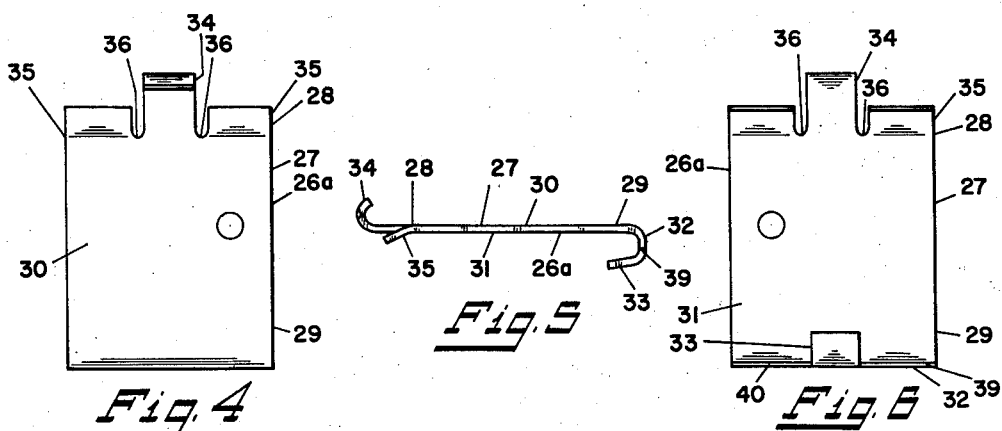
INVENTOR.
DAVID R. SOMMER
BY *Joseph G. Werner*
ATTORNEY June 8, 1965 D. R. SOMMER 3,187,398
KEY OPERATED BUCKLE CLAMP
Filed May 31, 1963 2 Sheets-Sheet 2

INVENTOR.
DAVID R. SOMMER
BY
ATTORNEY

United States Patent Office 3,187,398
Patented June 8, 1965

3,187,398
KEY OPERATED BUCKLE CLAMP
David R. Sommer, Madison, Wis., assignor to Humane Restraint Co., Madison, Wis., a partnership
Filed May 31, 1963, Ser. No. 284,425
6 Claims. (Cl. 24—191)

This invention relates to buckle clamps for belts, and more particularly to key operated buckle clamps for use wtih human restraining belts and safety pins.

Prior positive locking buckles or clamps in general use in the restraining and safety belt field require some form of holes in the belts with which they are used. Where such belts are made of web material, special grommets must be provided to prevent ripping of the webbing. Such grommets have a tendency to tear out of the belt and often require frequent replacement. To minimize the necessity for such replacement, most web safety and restraining articles using lock buckles are made with a thick, heavy duty web. Such a heavy web is not as gentle to the patient in restraint as a softer, lighter weight web, and is much more likely to cause bed sores and other skin irritations.

It is a primary object of my invention to eliminate the foregoing and other disadvantages by producing a positive locking buckle clamp for restraint belts which requires no holes to be placed in such belts.

It is a further object of my invention to provide a positive locking buckle clamp for a restraint belt which may be easily locked and unlocked by means of a key, but which is extremely difficult to open when such a key is not available.

It is a still further object of my invention to provide a positive locking buckle clamp for a restraint belt which remains in positive locking engagement with the belt regardless of whether the belt is drawn closely around the restrained person or is slack.

Other objects and advantages of my invention will be readily apparent from the following detailed description taken in conjunction with the accompanying drawings wherein a preferred embodiment of my invention has been selected for exemplification.

In the drawings:

FIG. 1 is a perspective view of my restraint belt buckle clamp in use.

FIG. 2 is a side elevation view of my restraint belt buckle clamp in the locked position.

FIG. 3 is a perspective view of my restraint belt buckle clamp in its unlocked position.

FIG. 4 is a top plan view of the novel key used to lock and unlock my restraint belt buckle clamp.

FIG. 5 is a side elevation view of the key of FIG. 4.

FIG. 6 is a bottom plan view of the key of FIG. 4.

Figure 7:
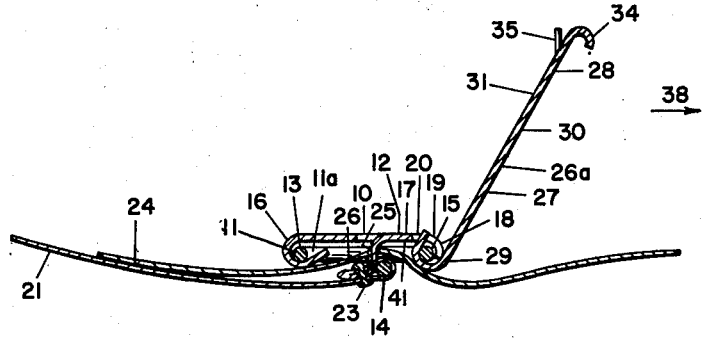
FIG. 7 is a sectional view taken along section line 7—7 of FIG. 1, showing the key of FIG. 4 in the position for unlocking my restraint belt buckle clamp.
Figure 8:
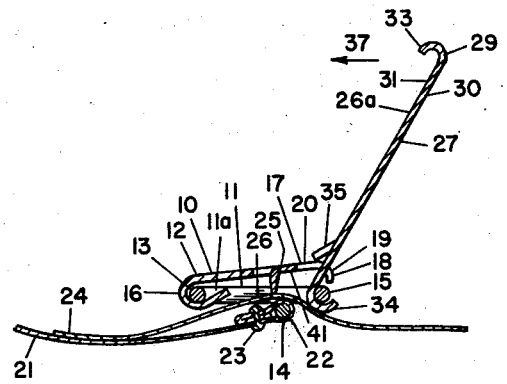
FIG. 8 is a sectional view taken similarly to FIG. 7 showing the key of FIG. 4 in the position for locking my restraint belt buckle clamp.

The novel buckle clamp 10 of my invention has, as shown in FIG. 3, two basic elements, a buckle frame 11 and a locking plate 12. The frame 11 has a pivot bar 13, a center bar 14 and a locking bar 15, all laterally extending between side bars 11a. As is evident from FIG. 2, the center bar 14, which is secured to the side bars 11a by any suitable means, is positioned between the pivot bar and the locking bar 15 and preferably, but not necessarily, immediately below the plane determined by the pivot bar 13, the locking bar 15 and the side bars 11a. While bar 14 is designated "center" bar, it need not be located midway between the pivot bar 13 and locking bar 15, but may be slightly off-center as shown in the drawings. The locking plate 12 has a pivot end 16 and a locking end 17. The pivot end 16 extends around the pivot bar 13, as shown in FIGS. 7 and 8, to secure the locking plate 12 to the buckle frame 11 in pivotable relation. The locking end 17 has a plurality of semicircular locking fingers 18 adapted to snap onto the locking bar 15 to secure the locking plate 12 to the buckle frame 11. The locking end 17 also has a cutout section 19, best seen in FIG. 1, which, together with the locking bar 15, defines a keyhole 20 into which is inserted the key 26a, shown in FIGS. 4 to 6, to lock or unlock the buckle clamp 10. To lessen the possibility of tampering the locking plate 12 is preferably of sufficient length to reach from one side bar 11a to the other as shown in FIG. 1. Such a construction of the locking plate 12 prevents openings between the ends of the locking plate 12 and the side bars 11a through which a lever might be inserted to pry the locking plate 12 free of the locking bar 15.

The restraint belt 21 has an attached end 22 and a free end 24. The attached end 22 is permanently connected to the buckle frame 11, preferably by looping it around the center bar 14 and then fixedly securing it to the immediately adjacent portion of the belt 21 by rivets 23 or any other suitable means. The free end 24 is conventionally threaded through the frame 11 by passing it beneath the locking bar 15, above the center bar 14 and beneath the pivot bar 13, as shown in FIGS. 7 and 8. A plurality of teeth 25 intgerally project from the locking plate 12 to engage the outer surface 26 of the restraint belt free end 24. For most secure engagement, the teeth 25 are positioned to rest in close proximity to the side of the center bar 14 adjacent the pivot bar 13 when the buckle clamp 10 is in the locked position shown in FIG. 7. It is preferable for best engagement that the teeth 25 have sufficient length to extend vertically downward to a point somewhat below the top of the center bar 14.

The teeth 25 are illustrated for exemplary purposes only; any other suitably secure belt engaging means may be substituted for the teeth 25. Examples of such means include a scalloped edge integrally projecting from the locking plate 12 and a knurled element fixedly attached to the under surface 41 of the locking plate 12. When the teeth 25 are employed, the center bar 14 may contain recesses or openings into which the teeth 25 can protrude. If such recesses are used, the center bar 14 is set to position the recesses in proper position to receive the teeth 25.

The key 26a which is employed to place the buckle clamp 10 either in the locked position of FIGS. 1 and 7 or the unlocked position of FIGS. 3 and 8 is illustrated in its preferred embodiment in FIGS. 4 to 6. The key 26a comprises a body 27 with a locking end 28 and an unlocking end 29. For descriptive purposes only, the two surfaces of the substantially flat body 27 are designated as the top surface 30 and the bottom surface 31. A projection 32 of the body 27 extends downward from the unlocking end 29 at approximately a right angle to the bottom surface 31. A lug 33 extends beneath the body 27 from approximately the middle of the projection 32 in substantially parallel relation to the body bottom surface 31. At the locking end 28, the body 27 has a centrally located J-shaped tongue 34 and two identical fingers 35 spaced on each side of the tongue 34 by notches 36. The tongue 34 is curved away from the bottom surface 31 toward the top surface 30. The fingers 35 are bent away from the top surface 30 toward the bottom surface 31 at some suitable angle to the longitudinal axis of the body 27. The magnitude of the angle is not critical; any magnitude which permits the tongue 34 and the fingers 35 to satisfy the functional requirements later described is acceptable.

The method of locking the buckle clamp 10 with the key 26a has as its initial step the drawing of the free end 24 of the belt 21 through the frame 11 in the manner previously described. After the belt 21 is adjusted to the proper degree of tightness around the person or object to be restrained, the locking plate 12 is pivoted about the pivot bar 13 until the locking fingers 18 contact and rest against the locking bar 15, as shown in FIG. 8. The tongue 34 of the key 26a is then inserted in the keyhole 20 from the outer side of the locking plate 12. As seen in FIG. 8, the tongue 34 is of such a size and shape as to easily slip around the locking bar 15. The fingers 35 have sufficient length relative to the tongue 34 and are properly inclined at a suitable angle to the longitudinal axis of the body 27 to place the tips of the fingers 35 in contact with the outer surface 36a of the locking plate 12 adjacent the cutout section 19 when the tongue 34 is curled around the locking bar 15. Once the tongue 34 and the fingers 35 are in the position shown in FIG. 8, the buckle clamp 10 is easily and quickly locked by rotating the key 26a, which is pivotably anchored to the locking bar 15 by the tongue 34, about the locking bar 15 in the direction of the arrow 37. As the key 26a rotates the fingers 35 slide along the outer surface 36a of the locking plate 12, applying a downward force to the locking plate 12 which soon snaps the locking fingers 18 over the locking bar 15 to place the buckle clamp 10 in the locked position shown in FIGS. 1 and 2.

To unlock the buckle clamp 10, the lug 33 is inserted into the keyhole 20 from the underside of the buckle frame 11, as shown in FIG. 7. The lug 33 is spaced a sufficient distance from the bottom surface 31 of the key 26a to permit the lug 33 to easily slip around the locking bar 15. Rotation of the key 26a about the locking bar 15 by means of the lug 33 in the direction of the arrow 38 brings the outer edges 39 and 40 of the projection 32 on each side of the lug 33 into force applying contact with the under surface 41 of the locking plate 12. Because of the leverage provided by the key 26a, the outward force thus applied against the locking plate 12 by the projection 32 is sufficient to snap the locking fingers 18 free of the locking bar 15 and place the buckle clamp 10 in the unlocked position shown in FIG. 3.

The tongue 34 and the fingers 35 of the key 26a may sometimes be omitted, if desired, for it is possible for the locking fingers 18 to be so constructed that they can be snapped over the locking bar 15 with the force of a person's fingers. However, when my buckle clamp 10 is properly constructed, it is virtually impossible for a person to unlock the buckle clamp 10 using only his fingers. A key having an unlocking end of the type described above, or some other suitable independent unlocking mechanism, must be employed to unlock the clamp.

The necessity of a key for unlocking my buckle clamp 10 makes it especially suitable for use with belts used to restrain patients at hospitals or rest homes. The teeth 25 which engage the belt 21 make it impossible for anyone to somehow pull or tug the belt 21 out of the buckle clamp 10 when the locking plate 12 is locked to buckle frame 11. With the exception of actual destruction of the belt 21 or the buckle clamp 10, the construction of the buckle clamp 10 prevents disengagement of the belt 21 by anyone who does not have a suitable key.

The variety of possible objects that might be used for a key is effectively reduced by making the cutout section 19 in the locking plate 12 a narrow slot. With a narrow slot forming the keyhole 20 few objects but the specially constructed key 26a illustrated and described are able to develope sufficient leverage to unlock a properly constructed buckle clamp 10.

While the locking plate 12 with the teeth 25 may be beneficially used with restraint belts, the broad concept of a key-operated locking plate may be applied to practically any kind of buckle. A locking plate without teeth, for example, might be employed with the usual kind of tongue buckle used on belts for wearing apparel, or on belts used for securing loads or equipment. The plate would be adapted to encompass the tongue when locked to the buckle. Such a combination of tongue, buckle and locking plate would prevent the development of any slack in the belt, or the accidental disengagement of the tongue and the belt due to vibrations.

It is understood that my invention is not confined to the particular construction and arrangement of parts herein illustrated and described, but embraces all such modified forms thereof as come within the scope of the following claims.

I claim:

1. In combination, a key-releasing buckle clamp for a restraint belt, and a key, comprising:
    (a) a buckle frame having a pivot bar, a locking bar, and a center bar,
    (b) a locking plate having a pivot end engaged in pivotable relation with said pivot bar and a locking end with locking means adapted to engage said locking bar in locked relation,
    (c) said locking plate extending over said center bar and having a plurality of teeth extending downwardly to a point below the top of said center bar and in close proximity to the side of said center bar adjacent said pivot bar when said locking plate and said buckle frame are engaged in locked relation,
    (d) said locking plate having a cutout section in said locking end to define with said locking bar a keyhole,
    (e) said key having a substantially flat body with an unlocking end,
    (f) said unlocking end having a projection extending from said flat body at substantially right angles thereto, and having a lug extending from said projection substantially parallel to said body,
    (g) said lug being adapted to be inserted in said keyhole to engage said locking bar, and said projection being adapted to engage said locking plate thereby to transmit a force to said locking plate to disengage said locking means of said locking plate from said locking bar.

2. The invention of claim 1 wherein the key has a locking end having a centrally located J-shaped tongue and two fingers located on opposite sides of said tongue and being bent in the opposite direction from said tongue, said tongue being adapted to be inserted in said keyhole to engage said locking bar, and said fingers being adapted to engage the locking means of the locking plate with the locking bar.

3. In combination, a key-releasing buckle clamp for a restraint belt, and a key, comprising:
    (a) a buckle frame having a pivot bar, a locking bar and a center bar,
    (b) a locking plate having a pivot end engaged in pivotable relation with said pivot bar and a locking end with locking means adapted to engage said locking bar in locked relation,
    (c) said locking plate having a cutout section in said locking end to define with said locking bar a keyhole,
    (d) said key having a substantially flat body with an unlocking end,
    (e) said unlocking end comprising a substantially perpendicular projection of said body and a lug which extends from approximately the middle of the outer edge of said projection beneath said body and in substantially parallel relation thereo.
    (f) said lug being insertable in said keyhole from the underside of said locking plate to slip around said locking bar,
    (g) the outer edge of said projection adjacent said lug being adapted to contact the underside of said locking plate when said key is thus inserted in said keyhole and said locking means is engaged with said locking bar in locked relation, whereby the rotation of said key in such direction to force said outer edge of said projection against the underside of said locking plate disengages said locking means from said locking bar.

4. The invention of claim 3 wherein:
(a) said key has a locking end adapted to move the locking means into locked relation with the locking bar,
(b) said key locking end comprising a centrally located J-shaped tongue extending from said key body, and two identical fingers spaced on each side of said tongue and extending from said key body,
(c) said J-shaped tongue being adapted to slip around said locking bar,
(d) said fingers being inclined at such an angle to said key body and having such length relative to said tongue that said fingers engage the outer surface of the locking plate when said tongue is inserted in said keyhole from the outer side of said locking plate and slipped around said locking bar and when said locking plate is pivoted about the pivot bar to bring said locking plate locking end in contact with said locking bar, whereby rotation of said key in such direction to force said fingers against the outer surface of said locking plate engages said locking means in locking engagement with said locking bar.

5. The invention of claim 3 wherein the locking means comprises semicircular locking fingers adapted to engage the locking bar.

6. The invention of claim 4 wherein gripping teeth project integrally downward from the locking plate toward the center bar, said teeth extending to a point below the top of said center bar and in close relation to the side of said center bar adjacent said pivot bar when said locking plate is engaged with the locking bar in locking relation.

References Cited by the Examiner
UNITED STATES PATENTS

| | | | |
|---|---|---|---|
| 573,093 | 12/96 | Lynch | 24—167 |
| 1,193,050 | 8/16 | Orewiler | 24—191 |
| 1,232,546 | 7/17 | Holden | 24—191 |
| 1,526,303 | 2/25 | Perrine | 24—191 |
| 2,520,583 | 8/50 | Ulmer | 24—73 |
| 2,607,970 | 8/52 | Anderson | 24—73 |

DONLEY J. STOCKING, *Primary Examiner.*

UNITED STATES PATENT OFFICE
CERTIFICATE OF CORRECTION

Patent No. 3,187,398                              June 8, 1965

David R. Sommer

It is hereby certified that error appears in the above numbered patent requiring correction and that the said Letters Patent should read as corrected below.

Column 1, line 10, for "wtih" read -- with --; same line 10, for "pins" read -- belts --; line 20, after "heavy", second occurrence, insert -- duty --; same column 1, line 68, after "pivot bar" insert -- 13 --; column 2, line 30, for "intgerally" read -- integrally --; column 4, line 68, for "thereo." read -- thereto, --.

Signed and sealed this 23rd day of November 1965.

(SEAL)
Attest:

ERNEST W. SWIDER                                        EDWARD J. BRENNER
Attesting Officer                                            Commissioner of Patents